US012554992B2

(12) United States Patent
Simumba et al.

(10) Patent No.: US 12,554,992 B2
(45) Date of Patent: Feb. 17, 2026

(54) SELF-SUPERVISED LEARNING USING IN-PAINTING

(71) Applicant: INTERNATIONAL BUSINESS MACHINES CORPORATION, Armonk, NY (US)

(72) Inventors: Naomi Simumba, Yokohama (JP); Michiaki Tatsubori, Oiso (JP); Daiki Kimura, Midori-ku (JP)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 18/321,143

(22) Filed: May 22, 2023

(65) Prior Publication Data

US 2024/0394547 A1 Nov. 28, 2024

(51) Int. Cl.
*G06N 3/0455* (2023.01)
*G06N 3/0895* (2023.01)
(Continued)

(52) U.S. Cl.
CPC ......... *G06N 3/0895* (2023.01); *G06N 3/0455* (2023.01); *G06T 5/70* (2024.01);
(Continued)

(58) Field of Classification Search
CPC .... G06N 3/0895; G06N 3/0455; G06N 3/045; G06N 3/084; G06N 3/088; G06T 5/70;
(Continued)

(56) References Cited

U.S. PATENT DOCUMENTS

| 10,388,002 B2 | 8/2019 | Ferrer |
| 2021/0012468 A1* | 1/2021 | Tagra ........................ G06T 5/77 |

(Continued)

FOREIGN PATENT DOCUMENTS

CN 112308860 A 2/2021

OTHER PUBLICATIONS

Huang et al, Contrastive Masked Autoencoders are Stronger Vision Learners, 2022, arXiv:2207.13532v2, pp. 1-15. (Year: 2022).*

(Continued)

*Primary Examiner* — Kathleen M Broughton
(74) *Attorney, Agent, or Firm* — Caleb D. Wilkes

(57) ABSTRACT

Self-supervised learning of a machine learning model using images. The computing device masks a section of each image in an image database to generate a partially masked image. An autoencoder encodes each partially masked image to generate one or more encodings representing each partially masked image. The autoencoder decodes each of the one or more encodings into one or more decoded encodings representing each partially masked image previously input into the autoencoder. The computing device compares each of the one or more decoded encodings of each partially masked image with the corresponding image from the image database to generate an unaugmented model output. The computing device augments each image according to a data augmentation policy to generate an augmented model output. The computing device determines a total loss by comparing the unaugmented model output to the augmented model output. The autoencoder is improved based upon the total loss.

20 Claims, 6 Drawing Sheets

(51) Int. Cl.
  *G06T 5/70* (2024.01)
  *G06T 5/77* (2024.01)
(52) U.S. Cl.
  CPC ...... *G06T 5/77* (2024.01); *G06T 2207/10032* (2013.01); *G06T 2207/20081* (2013.01)
(58) Field of Classification Search
  CPC ............. G06T 5/77; G06T 2207/10032; G06T 2207/20081
  See application file for complete search history.

(56) References Cited

U.S. PATENT DOCUMENTS

| | | | |
|---|---|---|---|
| 2021/0133936 A1* | 5/2021 | Chandra | G06T 5/50 |
| 2021/0407051 A1 | 12/2021 | Pardeshi | |
| 2022/0067983 A1* | 3/2022 | Fidler | G06N 3/09 |
| 2022/0101112 A1* | 3/2022 | Brown | G06N 3/0895 |
| 2023/0360181 A1* | 11/2023 | Kanazawa | G06T 5/77 |
| 2024/0202531 A1* | 6/2024 | Schmitt | G06N 3/047 |

OTHER PUBLICATIONS

Adedeji et al, "Image Augmentation for Satellite Images". arXiv:2207.14580v1 [cs.CV], Jul. 29, 2022, pp. 1-15.

Caron et al., "Deep clustering for unsupervised learning of visual features", https://openaccess.thecvf.com/content_ECCV_2018/papers/Mathilde_Caron_Deep_Clustering_for_ECCV_2018_paper.pdf, pp. 1-18.

Grill et al., "Bootstrap your own latent-a new approach to self-supervised learning. Advances in neural information processing systems", https://proceedings.neurips.cc/paper/2020/file/f3ada80d5c4ee70142b17b8192b2958e-Paper.pdf, 34th Conference on Neural Information Processing Systems (NeurIPS), 2020, pp. 1-14.

Iizuka et al., "Globally and locally consistent image completion", https://dl.acm.org/doi/abs/10.1145/3072959.3073659, ACM Transactions on Graphics (ToG), 36(4), Jul. 2017, pp. 1-14.

Jing et al., "Self-supervised Visual Feature Learning with Deep Neural Networks", https://ieeexplore.ieee.org/abstract/document/9086055, May 4, 2020, pp. 1-4.

Larsson et al., "Colorization as a proxy task for visual understanding", https://openaccess.thecvf.com/content_cvpr_2017/papers/Larsson_Colorization_as_a_CVPR_2017_paper.pdf, pp. 1-10.

Li et al., "Mat: Mask-aware transformer for large hole image inpainting", https://openaccess.thecvf.com/content/CVPR2022/papers/Li_MAT_Mask-Aware_Transformer_for_Large_Hole_Image_Inpainting_CVPR_2022_paper.pdf, In Proceedings of the IEEE/CVF conference on computer vision and pattern recognition, pp. 1-11.

Pathak, et al., "Context encoders: Feature learning by inpainting", In Proceedings of the IEEE conference on computer vision and pattern recognition, https://openaccess.thecvf.com/content_cvpr_2016/html/Pathak_Context_Encoders_Feature_CVPR_2016_paper.html, pp. 2536-2544.

Xie et al., "Unsupervised data augmentation for consistency training". ArXiv:1904.12848v6 [cs,LG], Nov. 5, 2020, pp. 1-20.

ESRI, "Land Cover Classification using Satellite Imagery and Deep Learning", available online at <https://web.archive.org/web/20240315000000*/https://developers.arcgis.com/python/latest/samples/land-cover-classification-using-unet/>, Jun. 26, 2022, 13 pages.

IJCCAI, "Preliminary Call for Papers", available online at <https://web.archive.org/web/20221205172251/https://ijcai-23.org/call-for-papers/>, Dec. 5, 2022, 8 pages.

Michiaki et al., "Towards Accelerated Discovery Services for Geospatiotemporal Foundation Models", GU Fall Meeting 2022, held in Chicago, IL, Dec. 12-16, 2022, id. IN32D-0405, Dec. 2022, 3 pages.

* cited by examiner

SELF-SUPERVISED LEARNING USING IN-PAINTING

FIELD OF THE INVENTION

The present invention relates generally to machine learning and more particularly to training of machine learning models for image recognition.

BACKGROUND

Presently disclosed embodiments relate to machine learning and, more generally, artificial intelligence. In 2023 machine learning is of increasing value to the public at large, with a diversity of applications including chat-bots, financial analysis, online shopping, fraud prevention, and many others. Image recognition, a subfield of machine learning, has a large number of potential applications itself, such as self-driving cars, robotics, satellite weather forecasting, medical imaging, and many others.

Although the value of machine learning and artificial intelligence is unquestionable, and is expected to continue to increase in the twenty-first century, the bane of these complex models is the need to "train" them. In order to generate correct extrapolations and predictions, machine learning models typically need a large amount of high-quality training data. Historically, a human subject-matter expert (or, more likely, a number of human subject-matter experts) would be needed to individually label training data in order to correctly train machine learning models. This is a tedious, expensive, and repetitive process, and prone to errors which lead to the roll-out of machine learning models very expensive in the present day.

A need presents itself for a simple and streamlined manner of training machine learning models to understand and interpret images without human subject-matter expert intervention.

SUMMARY

Embodiments of the present invention disclose a method, system, and computer program product for self-supervised learning of a machine learning model using images. A section of each image made available from an image database containing one or more images is masked to generate a partially masked image of each image in the image database. An autoencoder associated with the computing device encodes each partially masked image to generate one or more encodings representing each partially masked image. The autoencoder decodes each of the one or more encodings into one or more decoded encodings, the one or more decoded encodings representing each partially masked image previously input into the autoencoder. The computing device compares each of the one or more decoded encodings of each partially masked image with the corresponding image from the image database to generate an unaugmented model output. The computing device augments each partially masked image according to a data augmentation module to generate one or more augmented partially masked images. The computing device inputs each augmented partially masked image into the autoencoder to obtain an augmented model output. The computing device determines a total loss by comparing the unaugmented model output to the augmented model output. The computing device improves the autoencoder based upon the determined total loss to create an improved autoencoder.

In alternative aspect of the present invention, embodiments of the present invention disclose another method, system, and computer program product for self-supervised learning using images. A section of each image made available from an image database containing one or more images is masked to generate a partially masked image of each image in the image database. An autoencoder associated with the computing device encodes each partially masked image to generate one or more encodings representing each partially masked image. The autoencoder decodes each of the one or more encodings into one or more decoded encodings, the one or more decoded encodings representing each partially masked image previously input into the autoencoder. The computing device compares each of the one or more decoded encodings of each partially masked image with the corresponding image from the image database to generate an unaugmented model output. The computing device augments each image according to a data augmentation policy to generate an augmented model output. The computing device determines a total loss by comparing the unaugmented model output to the augmented model output. The computing device improves the autoencoder based upon the determined total loss to create an improved autoencoder.

DETAILED DESCRIPTION

Figure 1:
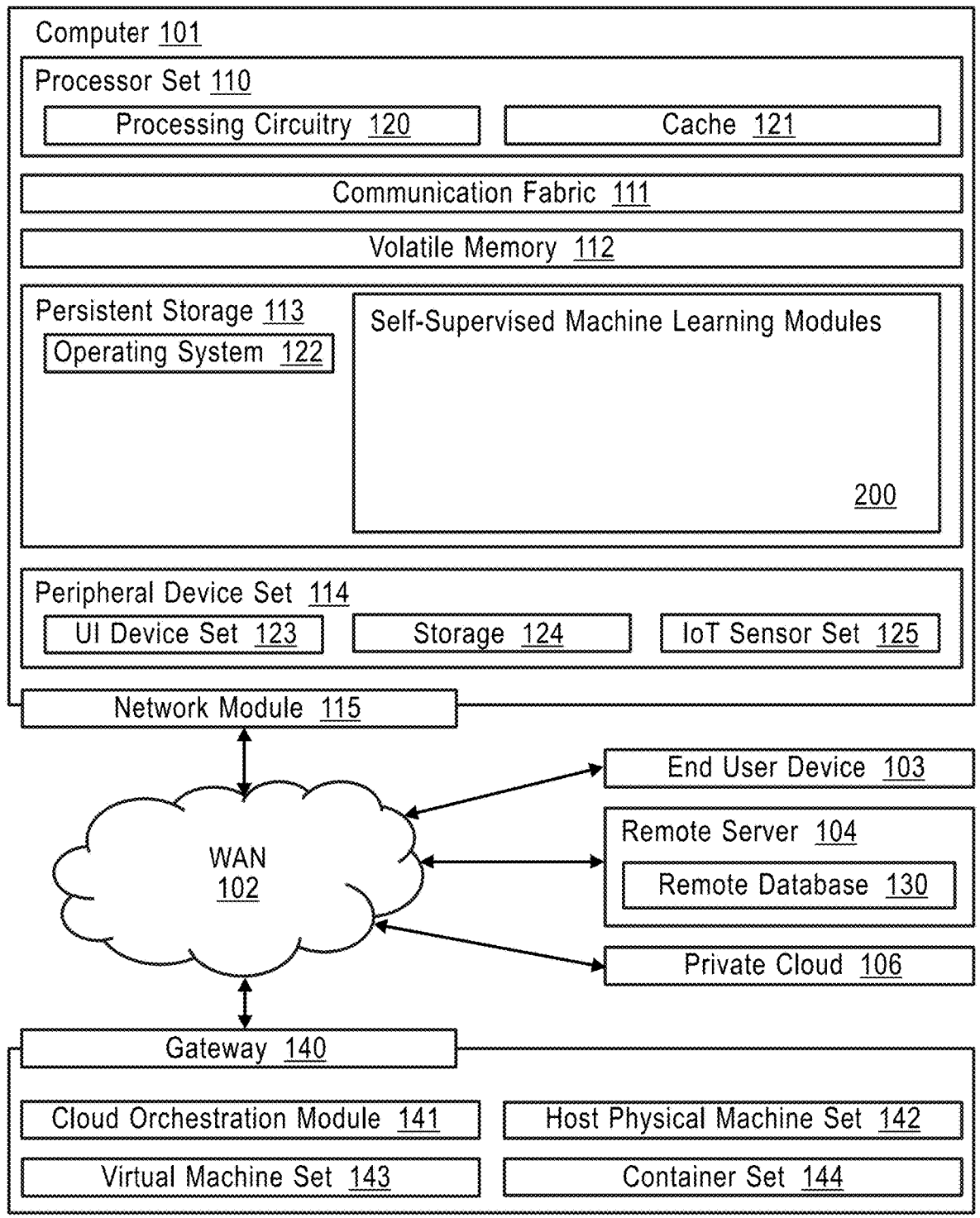
FIG. 1 represents a networked computer environment 100, in accordance with an embodiment of the present invention.

The presently disclosed embodiments relate one or more methods, systems, and computer program products for self-supervised learning of machine learning models. By using no human-labeled training samples in training of machine learning models, significant cost and time savings are presented in training of machine learning models. Furthermore, in the example of machine learning models trained using images, technology in these applications may utilize cameras to collect large amounts of image data every day by, for example, satellites taking ground and weather pictures, self-driving cars taking pictures of road conditions, taking pictures of other cars, etc. Any image-based application where large amounts of images are collected may take advantage of embodiments of the invention disclosed herein. It would not be practical (or likely even possible) for human developers to use all of these collected images to further train machine learning models, whereas self-supervised learning provides for improvement of these machine learning models using an automated process. "Self-supervised learning" learning, generally, allows machine learning models to be trained using unstructured data (such as images collected by a satellite, car, etc., as discussed) which is labeled automatically, in order to improve the machine learning models with a maximum of efficiency (and other advantages as discussed). Presently disclosed embodiments may be implemented as part of an automated machine learning environment, as a plug-in to a web browser, as a stand-alone application, or in any other way, while being contemplated by embodiments of the invention disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as associated with self-supervised machine learning modules 200. In addition to modules 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and modules 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processor set 110 may be alternatively be referred to herein as one or more "computing device(s)," but computing devices may also refer to one or more CPUs, microchips, integrated circuits, embedded systems, or the equivalent, presently existing or after-arising. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in modules 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in modules 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
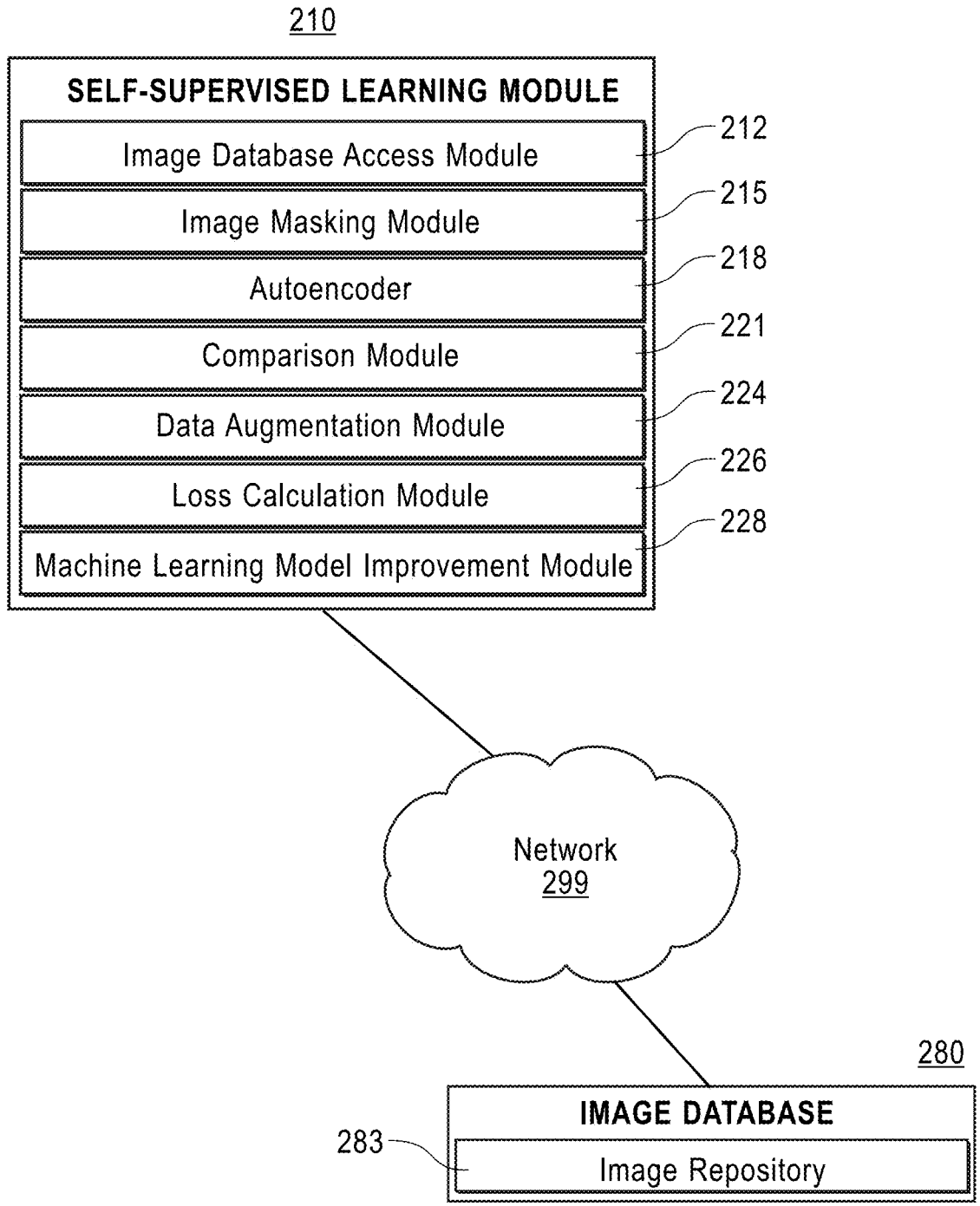
FIG. 2 is a functional block diagram illustrating self-supervised machine learning modules 200, in accordance with an embodiment of the present invention.

FIG. 2 is a functional block diagram illustrating self-supervised machine learning modules 200, in accordance with an embodiment of the present invention. In an embodiment of the invention, such as displayed in FIG. 2, self-supervised learning module 210 is operatively connected to image database 280 directly or via network 299. Self-supervised learning module 210 may be any sort of computer software (and, in various embodiments, associated computer hardware) for accessing images available from image database 280, as well as providing various functionality to utilize images as training data to provide for self-supervised learning and improvement of machine learning models based upon the images.

The images stored in image database 280 may, in various embodiments of the invention, be satellite images, images taken by a self-driving car, radar images, sonar images, or any other type of images to be used in self-supervised training. A machine learning model trained or improved with satellite images will, in various embodiments of the invention, be adapted for interpretation of satellite images, a machine learning model trained with radar images will be adopted for interpretation of radar images, etc., although other predictions may be possible, as would be understood by one of skill in the art.

As further displayed in FIG. 2, in various embodiments of the invention, self-supervised learning module 210 and image repository 280 are connected to and via network 299. In various embodiments of the invention, network 299 represents, for example, any sort of computer network such as a local area network (LAN), a wide area network (WAN) such as the Internet, and includes wired, wireless, or fiber optic connections. In various embodiments, network 299 is substantially the same as WAN 102, discussed in connection with FIG. 1 herein. In general, network 299 may be any combination of connections and protocols that will support communications between self-supervised learning module 210 and image repository 280, in accordance with embodiments of the invention. In further embodiments of the invention, network 270 may represent an internal bus associated with a single or multicore processor executing both self-supervised learning module 210 and image repository 280 (such as in an embodiments where self-supervised learning module 210 and image repository 280 are integrated).

Discussing elements displayed in FIG. 2 in further detail, self-supervised learning module 210 represents computer software (and, in various embodiments, associated computer hardware), for accessing images available from image database 280 and performing various modifications, transformations, and comparisons upon the accessed images (as discussed herein) to provide for self-supervised learning and training of one or more machine learning models. In various embodiments of the invention, self-supervised learning module 210 includes one or more of image database access module 212, image masking module 215, autoencoder 218, comparison module 221, data augmentation module 224, loss calculation module 226, and machine learning improvement module 228. In various embodiments of the invention, self-supervised learning module 210 is implemented as part of an automated machine learning environment, as a plug-in to a web browser, as a stand-alone application, or in any other way, while being contemplated by embodiments of the invention disclosed herein.

Image database access module 212 represents software and/or hardware for accessing one or more images available from image database 280. As discussed further herein, images available from image database 280 are in an unedited form, and are to be utilized to train machine learning models in a self-supervised manner. In embodiments of the invention, no images accessed by image database access module 212 are labeled by a subject-matter expert.

Image masking module 215 represents software and/or hardware for masking sections of images accessed from image database access module 212. Images masked by image masking module 215 may be altered in any way by image masking module 215 in "masking" them. In various embodiments of the invention, a section of one or more images from image masking module 215 may be "filled-in," removed, blacked-out, obscured, etc. As discussed further herein, by "filling-in," or altering in some other way images from image database, 280, machine learning models may learn to encode partially-masked and/or unmasked images from the image database 280 into reduced dimension encodings or other representations of the images. Image masking module 215 may function via a "masking function" performing operations on images received from image database 280, in order to perform "masking," as discussed. Image masking module 215 may contain, in embodiments of the invention, a "masking channel" which defines a region of images which have been masked, and communicates such information elsewhere in self-supervised learning module 210, such as to autoencoder 218.

Autoencoder 218 represents machine learning software and/or associated hardware for compression/encoding of data to generate encodings of the data ("encodings"). As discussed elsewhere herein, the data input into autoencoder 218, in embodiments of the invention, is images from image database 280. Autoencoder 218, in embodiments of the invention, also decompresses/decodes the generated encodings to representations of their original states ("decoded encodings"), which may or may not be identical to the original data input into autoencoder 218. Differences between the original data encoded by autoencoder 218 and decoded encodings are utilized in embodiments of the invention, in connection with downstream machine learning tasks, such as, in various embodiments, improvement of autoencoder 218 itself. Autoencoder 218 may be, by non-limiting example, an unsupervised/semi-supervised/supervised neural network in the form of a FeedForward network, long-short term memory, or a convolutional neural network. In embodiments of the invention, another type of machine learning model presently existing or after-arising providing similar functionality may replace autoencoder 218. Autoencoder 218 in embodiments serves to encode partially masked and/or unmasked images from image database 280 into reduced dimension encodings or other representations of the images, as well as decode the encodings/representations of the images back to representations of their original states. "Reduced dimension encodings" as used herein refers to encodings of images which take up less memory space, contain a reduced number of vectors, execute more quickly, etc., as would be understood by one of skill in the art. "Loss" from actions of autoencoder 218 encoding/decoding is used, as further discussed herein. In embodiments of the invention, as autoencoder 218 encodes/decodes masked/unmasked images, "noise" may be removed from the images which could lead to more accurate interpretations and predictions associated with future data input into autoencoder 218, as discussed further herein. Autoencoder 218 may utilize one or more skip connections utilizing one or more residual networks, in order to improve encoding/decoding capability. In various embodiments of the invention, autoencoder 218 may be improved by iterations of execution of embodiments of the invention, as discussed further in connection with machine learning model improvement module 228. Autoencoder 218 may be also or alternatively be improved through back-propagation of encodings/decodings in order to learn areas of error. As further discussed herein, an improved autoencoder 218 may be utilized in one or more downstream applications.

Comparison module 221 represents software and/or associated hardware for comparison of data input into autoencoder 218 (e.g. images) and/or original images received from image database 280 with decoded encodings of the same data, decoded by autoencoder 218. Comparisons performed by comparison module 221 are output as an "unaugmented model output" ("augmentation," on the other hand, is discussed further in connection with data augmentation module 224). Unaugmented model output may be represented as a percentage, whole number, a coordinate system, one or more vectors, one or more variables, or otherwise, as contemplated by embodiments of the invention. In embodiments of the invention, unaugmented model output may include a "reconstruction loss," indicating in mathematical terms a difference between an original image and related decoded encoding, decoded by autoencoder 218.

Data augmentation module 224 represents software and/or associated hardware for augmentation of images made available from image database 280, according to one or more data augmentation policies. Data augmentation module 224 may, in "augmenting" data cause channels of images to be removed or altered, certain colors to be altered, boundaries of images or portions of images to be resized, color(s) changed, brightness changed, pixels to be jointed, etc. As would be understood by one of skill in the art, since images may contain "noise" which would increase the likeliness of bad interpretations of future data made by a machine learning model, by augmenting the images, potential "noise" may be removed from images, which allows as further discussed herein, more accurate predictions to be made by machine learning models. In various embodiments of the invention, data augmentation module 224 augments partially masked images and/or original images available from the image database 280 to generate augmented partially masked images or augmented original images. The augmented partially masked images, or augmented original images are used, as more fully discussed herein. In an embodiment of the invention, the augmented partially masked images or augmented original images are input into autoencoder 218 to obtain an augmented model output.

Loss calculation module 226 represents software and/or hardware for determining of a total loss, as further discussed herein. Total loss is used in various downstream machine learning applications, and, in various embodiments, improvement of autoencoder 218. In an embodiment of the invention, loss calculation module 226 determines total loss by comparing the unaugmented model output (generated by comparison module 221, as discussed herein), with the augmented model output (generated by data augmentation module 224). In another embodiment of the invention, loss calculation module 226 determines a total loss by comparing the unaugmented model output generated by comparison module 221 with one or more augmented images generated by data augmentation module 224 in determining total loss. Total loss may be used, in various embodiments, to improve "weights" in an encoding portion of autoencoder 218, for more accurate interpretations, as would be understood by one of skill in the invention. In various embodiments of the invention, reconstruction loss may be used additionally to consistency loss, while being contemplated within embodiments of the invention.

Machine learning improvement model 228 represents software and/or hardware for utilization of total loss (calculated by loss calculation module 226) in order to improve one or more machine learning models (or perform other downstream artificial intelligence tasks). Machine learning improvement module 228, in order to improve, for example, autoencoder 218 may utilize the total loss to improve weights in an encoding portion of autoencoder 218. In an embodiment of the invention, total loss (calculated by loss calculation module 226) is utilized directly in improving autoencoder 218, since in general "losses" between encoding and decoding of the same encoding, with other calculations and comparisons as further discussed herein, are utilized to improve functionality of autoencoder 218. In other embodiments, machine learning improvement module 228 is used for downstream improvement of machine learning models for self-supervised improvement of their functionality (i.e., for better recognition, transformations, etc. of images available from image database 280.)

Continuing with regard to FIG. 2, image database 280 includes image repository 283. As discussed elsewhere herein, in other embodiments of the invention, image database 280 may be integrated with self-supervised learning module 210, function as a stand-alone application or database, as a plug-in to a web browser, or in any other form while still being contemplated in embodiments of the invention.

Image repository 283 represents software and/or hardware for storage of one or more images for utilization in connection with embodiments discussed herein. The images stored in image repository 280 may, in various embodiments, be satellite images, radar images, sonar images, images taken by a self-driving car (such as of road conditions, traffic signals, other vehicles, or any other type of images to be used in self-supervised training. In other embodiments of the invention, the images stored in image repository 283 are also classified, etc. by machine learning models. In various embodiments of the invention, images stored in image repository 283 may be in .gif, .jpg, .bmp, or any other presently existing or after-arising file format accessible to self-supervised learning module 210 and possessing sufficient resolution to be used in connection with embodiments disclosed herein. Image stored in image repository 283 may be taken by one or more digital cameras associated with, by non-limiting example, satellites, radar, a self-driving car, etc. or acquired in any other way presently existing or after arising (such as by radar imaging).

Figure 3:
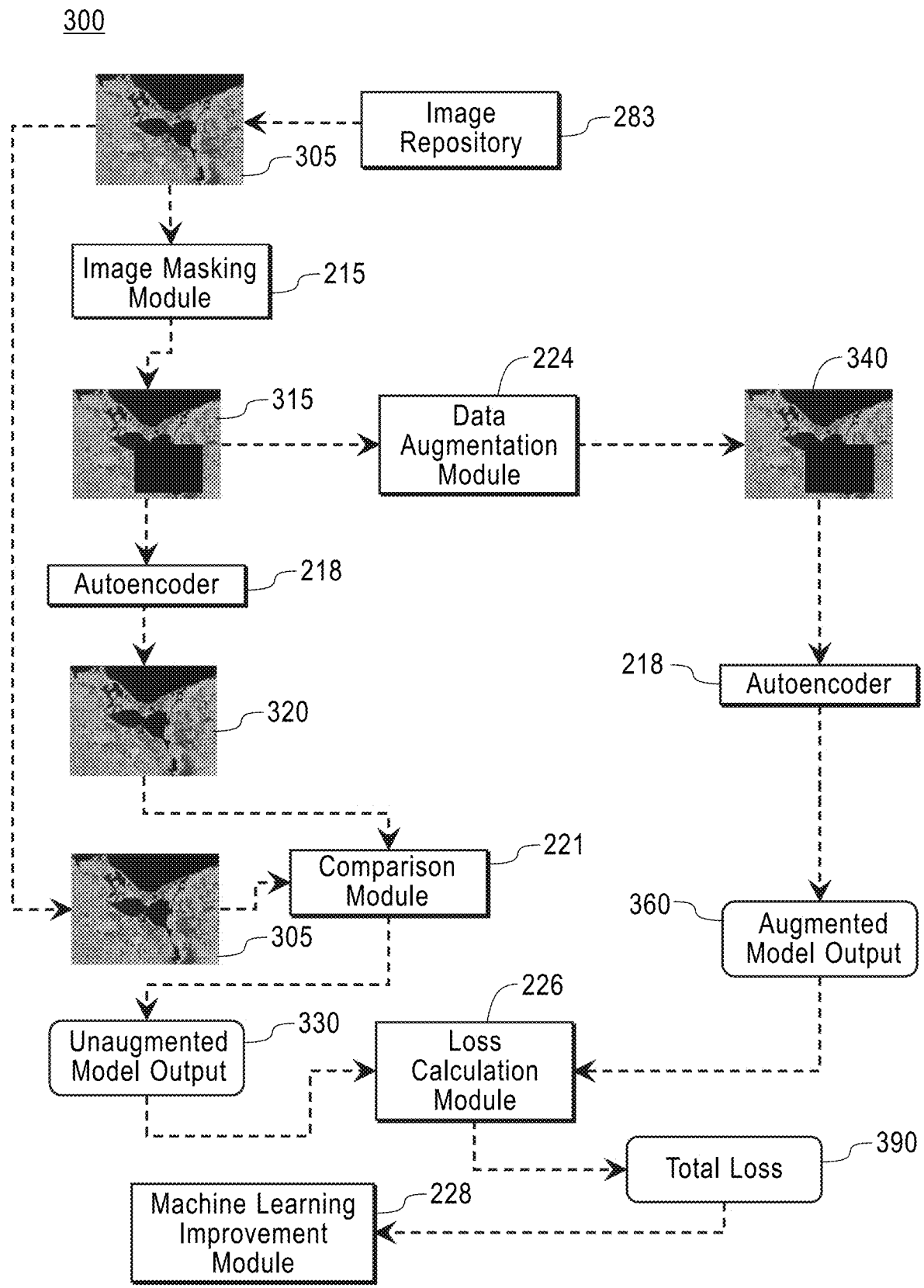
FIG. 3 is a process flow diagram 300 illustrating self-supervised learning of a machine learning model using images, in accordance with an embodiment of the present invention.

FIG. 3 is a process flow diagram 300 illustrating self-supervised learning of a machine learning model using images, in accordance with an embodiment of the present invention. An original image 305 (here, a satellite image) is displayed. Original image 305 is received from image repository 283 (associated with image database 280). A portion of image 305 is masked by image masking module 215 to generate a partially masked image 315. Only one image 305 and one associated partially masked image 315 are displayed in FIG. 3, but as would be understood by one of skill in the art, embodiments of the invention contemplate any number of image(s) 305 and partially masked image(s) 315 as being utilized in self-supervised learning of a machine learning model. Using a larger number of potential training data samples typically results in more accurate machine learning model training. Partially masked image 315 is encoded by autoencoder 218 into an encoding representing partially masked image 315 (not displayed here), and the encoding is decoded by autoencoder 218 into a decoded encoding 320 (the decoded encoding 320 representing the partially masked image input into autoencoder 218). The decoded encoding 320 and original image 305 are compared by comparison module 221 to generate an unaugmented model output 330 (the unaugmented model output 330 including, in various embodiments, a "reconstruction loss" indicating differences between the original image 305 and the decoded encoding 320).

Continuing with regard to FIG. 3, data augmentation module 224 augments partially masked image 315 to generate an augmented partially masked image 340. The augmented partially masked image 340 is also input into autoencoder 218 to obtain an augmented model output 360. The augmented model output 360 and unaugmented model output 330 are used by loss calculation module 226 to determine total loss 390. Total loss 390 is used by machine learning improvement module 228 to further improve autoencoder 218 (or provide other downstream machine learning functions), as further discussed herein.

Figure 4:
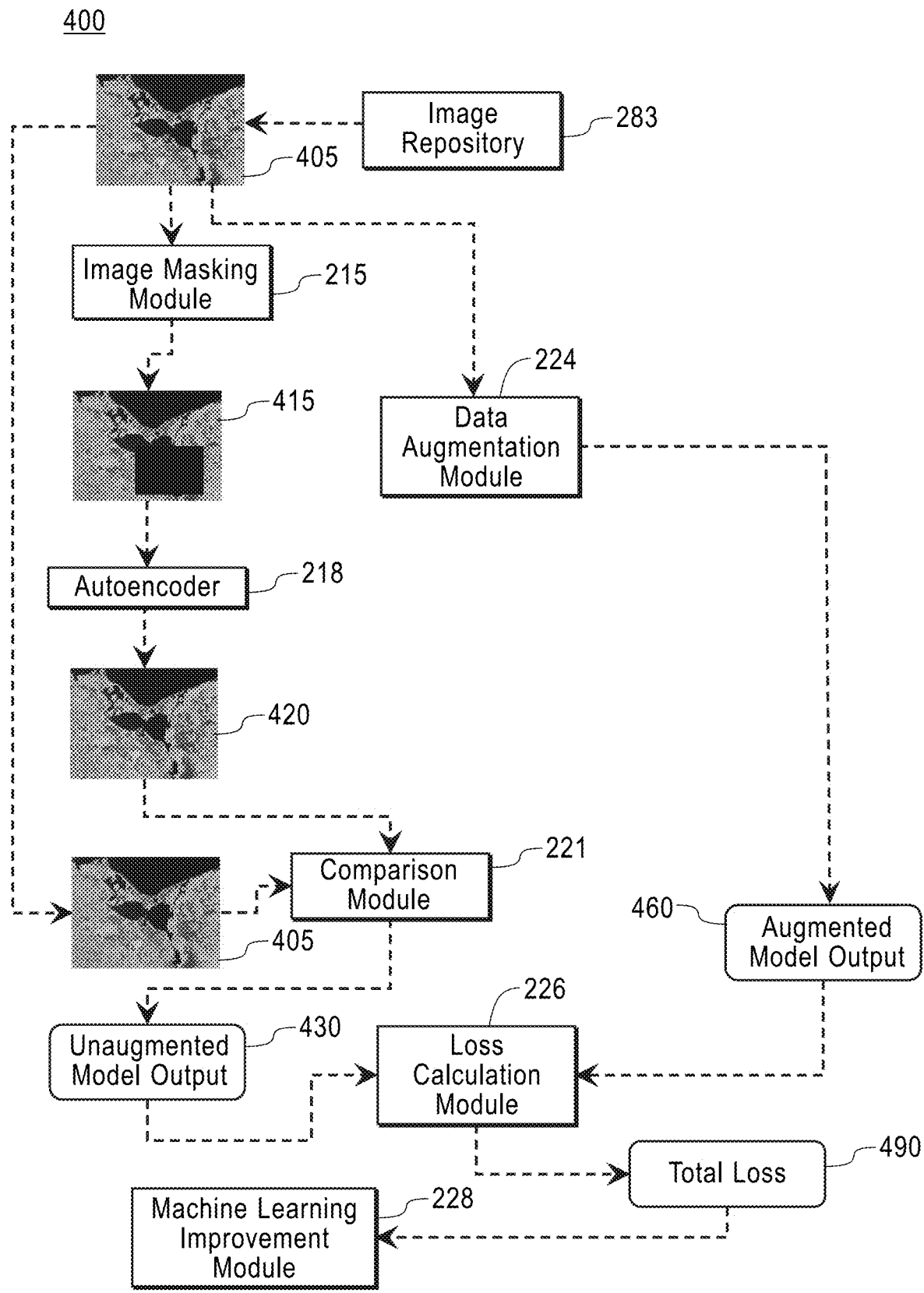
FIG. 4 is a process flow diagram 400 illustrating an alternative means of self-supervised learning of machine learning model using images, in accordance with an embodiment of the present invention.

FIG. 4 is a process flow diagram 400 illustrating an alternative means of self-supervised learning of a machine learning model using images, in accordance with an embodiment of the present invention. An original image 405 (here, a satellite image) is displayed. Original image 405 is received from image repository 283 (associated with image database 280). A portion of image 405 is masked by image masking module 215 to generate a partially masked image 415. Only one image 405 and associated partially masked image 415, etc. are displayed in FIG. 4, but as would be understood by one of skill in the art, embodiments of the invention contemplate any number of image(s) 405/partially masked image(s) 415 as being utilized in self-supervised learning of a machine learning model. Using a larger number of potential training data samples typically results in more accurate machine learning model training. Partially masked image 415 is encoded by autoencoder 218 into an encoding representing partially masked image 415 (not displayed here), and the encoding is decoded by autoencoder 218 into a decoded encoding 420 (the decoded encoding 420 representing the partially masked image input into autoencoder 218). The decoded encoding 420 and the original image 405 are compared by comparison module 221 to generate an unaugmented model output 430 (the unaugmented model output 430 including, in various embodiments, a "reconstruction loss" indicating differences between the original image 405 and the decoded encoding 420).

Continuing with regard to FIG. 4, data augmentation module 224 augments original image 405 according to a data augmentation policy to generate an augmented model output 460. The unaugmented model output 430 and the augmented model output 460 are used by loss calculation module 226 to determine total loss 490. Total loss 490 is used by machine learning improvement module 228 to further improve autoencoder 218 (or provide other downstream machine learning functions).

Figure 5:
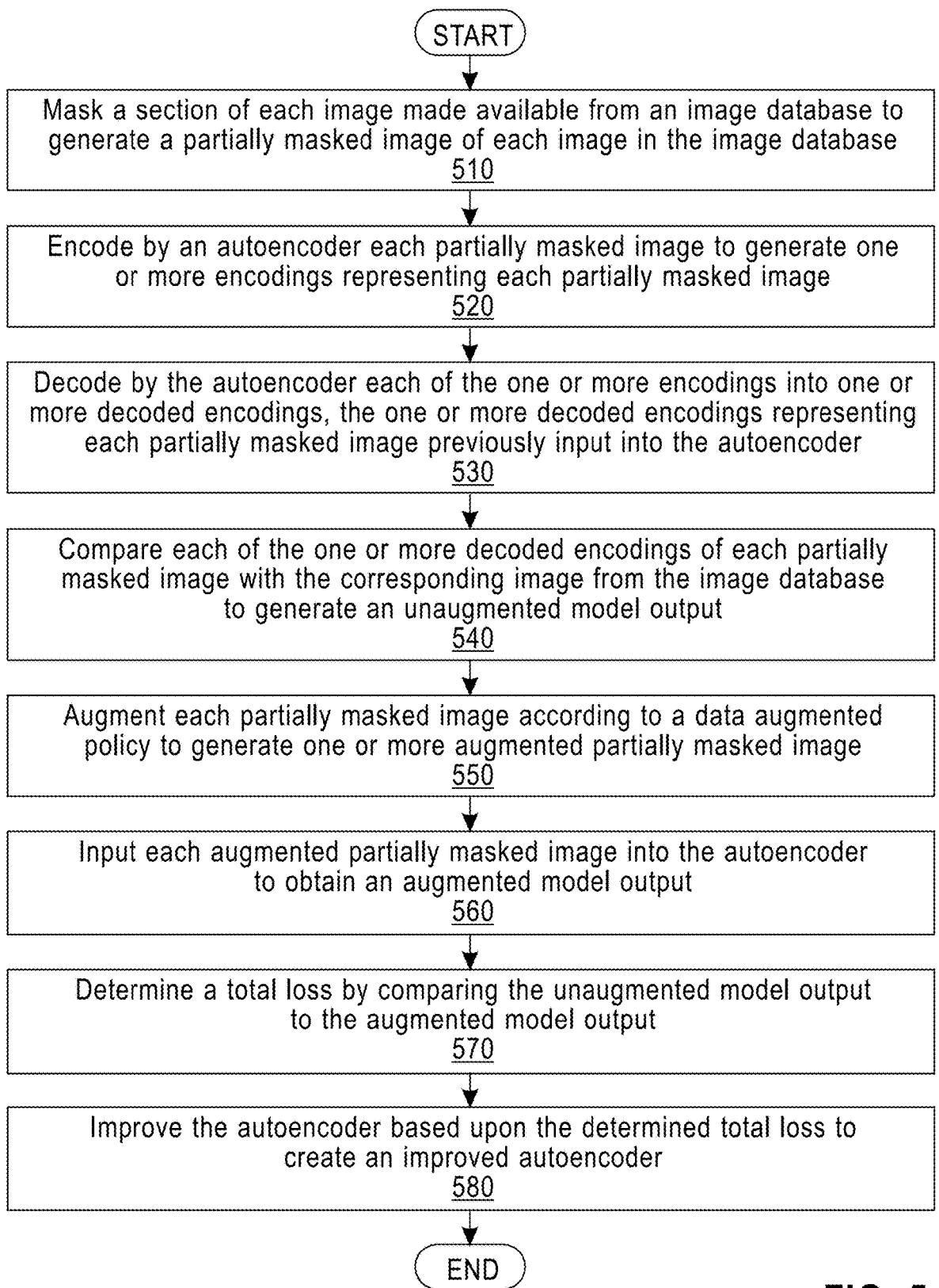
FIG. 5 is a flowchart depicting operational steps that a hardware component of a hardware appliance may execute, in accordance with an embodiment of the invention.

FIG. 5 is a flowchart depicting operational steps that a hardware component, multiple hardware components, and/or a hardware appliance may execute, in accordance with an embodiment of the invention. As shown in FIG. 5, at step 510 image masking module 215 masks a section of each image made available from image database 280 to generate a partially masked image of each image in the image database 280. At step 520, autoencoder 218 encodes each partially masked image to generate one or more encodings representing each partially masked image. At step 530, autoencoder 218 decodes each of the one or more encodings to generate one or more decoded encodings, the decoded encodings representing each partially masked image previously input into the autoencoder 218. At step 540, comparison module 221 compares the one or more decoded encodings of each partially masked image with the corresponding image from image database 280 to generate an unaugmented model output.

Continuing with regard to FIG. 5, at step 550 data augmentation module 224 augments each partially masked image according to a data augmentation policy to generate one or more augmented partially masked images. At step 560 each partially masked image is input into autoencoder 218 to obtain an augmented model output. At step 570, a total loss is calculated by loss calculation module 226 by comparing the unaugmented model output to the augmented model output. At step 580, machine learning model improvement module 228 utilizes the determined total loss to improve autoencoder 218.

Figure 6:
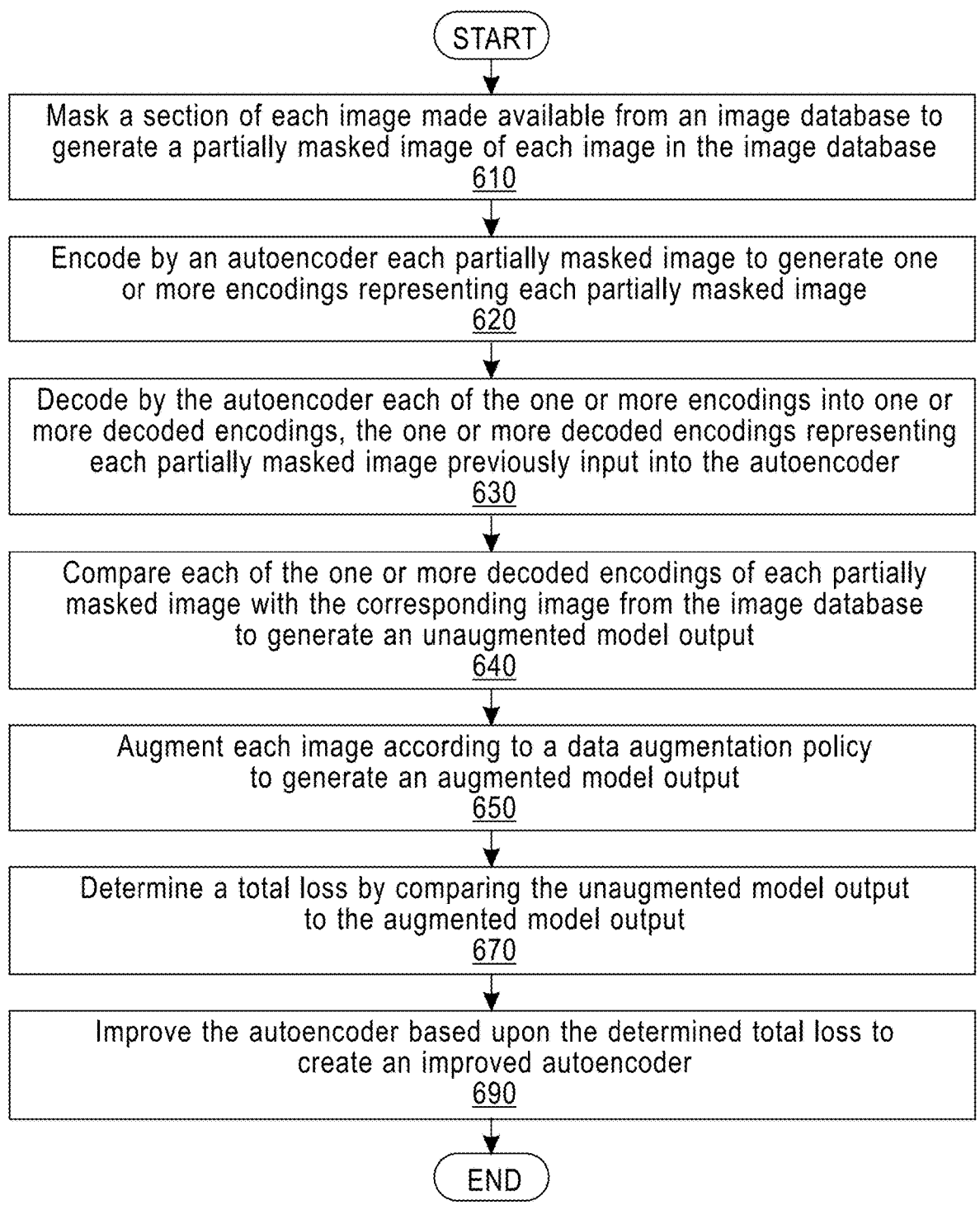
FIG. 6 is a flowchart depicting alternative operational steps that a hardware component of a hardware appliance may execute, in accordance with an embodiment of the invention.

FIG. 6 is a flowchart depicting alternative operational steps that hardware component, multiple hardware components, and/or a hardware appliance may execute, in accordance with an embodiment of the invention. As shown in FIG. 6, at step 610 image masking module 215 masks a section of each image made available from image database 280 to generate a partially masked image of each image in the image database 280. At step 620, autoencoder 218 encodes each partially masked image to generate one or more encodings representing each partially masked image. At step 630, autoencoder 218 decodes each of the one or more encodings into one or more decoded encodings, the decoded encodings representing each partially masked image previously input into the autoencoder 218. At step 640, comparison module 221 compares the one or more decoded encodings of each partially masked image with the corresponding image from image database 280 to generate an unaugmented model output.

Continuing with regard to FIG. 6, at step 650 data augmentation module 224 augments each image according to a data augmentation policy to generate an augmented model output. At step 670, a total loss is calculated by loss calculation module 226 by comparing the unaugmented model output to the augmented model output. At step 690, machine learning model improvement module 228 utilizes the determined total loss to improve autoencoder 218.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method using a computing device for self-supervised learning of a machine learning model using images, the method comprising:
   masking by the computing device a section of each of multiple images made available from an image database containing one or more images to generate a respective partially masked image of each of the multiple images;
   encoding by an autoencoder associated with the computing device each partially masked image to generate one or more encodings respectively representing each partially masked image;
   decoding by the autoencoder each of the one or more encodings into one or more decoded encodings as respective first reconstructions of the multiple images;
   comparing by the computing device each of the one or more decoded encodings of each partially masked image with a corresponding image of the multiple images to generate a reconstruction loss;
   augmenting by the computing device each partially masked image according to a data augmentation policy to generate one or more augmented partially masked images;
   inputting by the computing device each augmented partially masked image into the autoencoder to obtain an augmented model output;
   determining by the computing device a total loss by using:
   the reconstruction loss and
   a consistency loss of the augmented model output; and
   improving by the computing device the autoencoder based upon the determined total loss to create an improved autoencoder.

2. The method of claim 1, wherein the encoding of each partially masked image is a reduced dimension representation for each partially masked image.

3. The method of claim 1, wherein the one or more images in the image database are satellite images.

4. The method of claim 1, wherein the one or more images in the image database are not labeled by a subject-matter expert.

5. The method of claim 1, wherein masking by the computing device the section of each image is performed by a masking function.

6. The method of claim 1, wherein the autoencoder functions as a noise remover.

7. The method of claim 1, wherein the autoencoder uses one or more skip connections.

8. The method of claim 1, wherein the autoencoder is improved via back-propagation.

9. The method of claim 1, wherein the improved autoencoder is used in other machine learning applications.

10. The method of claim 1, wherein the autoencoder includes a masking channel, the masking channel defining a masked region of each image.

11. The method of claim 1, wherein the masking covers less than half of each of the multiple images.

12. The method of claim 1, wherein for the encoding of each partially masked image the respective partially masked image is a sole input into the autoencoder.

13. A method using a computing device for self-supervised learning of a machine learning model using images, the method comprising:
   masking by the computing device a section of each of multiple images made available from an image database to generate a respective partially masked image of each of the multiple images;
   encoding by an autoencoder associated with the computing device each partially masked image to generate one or more encodings representing each partially masked image;
   decoding by the autoencoder each of the one or more encodings into one or more decoded encodings as respective first reconstructions of the multiple images;
   comparing by the computing device each of the one or more decoded encodings with a corresponding image of the multiple images to generate a reconstruction loss;
   augmenting by the computing device each of the multiple images according to a data augmentation policy to generate an augmented model output;
   determining by the computing device a total loss by using:
   the reconstruction loss and
   a consistency loss of the augmented model output; and
   improving by the computing device the autoencoder based upon the determined total loss to create an improved autoencoder.

14. The method of claim 10, wherein the one or more images in the image database are satellite images.

15. The method of claim 14, wherein the autoencoder includes a masking channel, the masking channel defining a masked region of each image.

16. The method of claim 13, wherein the augmented model output includes one or more images.

17. The method of claim 13, wherein the masking covers less than half of each of the multiple images.

18. The method of claim 13, wherein for the encoding of each partially masked image the respective partially masked image is a sole input into the autoencoder.

19. The method of claim 13, wherein the improved autoencoder is used in other machine learning applications.

20. A computer system for self-supervised learning of a machine learning model using images, the computer system comprising:
- one or more computer processors;
- one or more computer-readable storage media;
- program instructions stored on the computer-readable storage media for execution by at least one of the one or more processors, the program instructions comprising:
    - program instructions to mask a section of each of multiple images made available from an image database to generate a respective partially masked image of each of the multiple images;
    - program instructions to encode by an autoencoder each partially masked image to generate one or more encodings representing each partially masked image;
    - program instructions to decode by the autoencoder each of the one or more encodings into one or more decoded encodings as respective first reconstructions of the multiple images;
    - program instructions to compare by the computer system each of the one or more decoded encodings of each partially masked image with a corresponding image of the multiple images to generate a reconstruction loss;
    - program instructions to augment by the computer system each of the multiple images according to a data augmentation policy to generate an augmented model output;
    - program instructions to determine by the computer system a total loss by using:
        - the reconstruction loss and
        - a consistency loss of the augmented model output; and
    - program instructions to improve by the computer system the autoencoder based upon the determined total loss to create an improved autoencoder.

* * * * *